United States Patent
Moller et al.

(10) Patent No.: US 7,313,089 B2
(45) Date of Patent: Dec. 25, 2007

(54) METHOD AND APPARATUS FOR SWITCHING BETWEEN ACTIVE AND STANDBY SWITCH FABRICS WITH NO LOSS OF DATA

(75) Inventors: Hanan Z. Moller, Austin, TX (US); David P. Sonnier, Austin, TX (US); Christopher Koob, Pflugerville, TX (US)

(73) Assignee: Agere Systems Inc., Allentown, PA (US)

( * ) Notice: Subject to any disclaimer, the term of this patent is extended or adjusted under 35 U.S.C. 154(b) by 873 days.

(21) Appl. No.: 10/037,165

(22) Filed: Dec. 21, 2001

(65) Prior Publication Data

US 2003/0117949 A1 Jun. 26, 2003

(51) Int. Cl.
*G01R 31/08* (2006.01)
(52) U.S. Cl. ...................................... 370/219; 370/220
(58) Field of Classification Search ......... 370/216–228
See application file for complete search history.

(56) References Cited

U.S. PATENT DOCUMENTS

| | | | |
|---|---|---|---|
| 5,072,440 A | | 12/1991 | Isono et al. |
| 5,953,314 A | * | 9/1999 | Ganmukhi et al. ......... 370/220 |
| 6,661,786 B1 | * | 12/2003 | Abbiate et al. ............. 370/386 |
| 6,882,766 B1 | * | 4/2005 | Corbalis et al. .............. 385/16 |
| 6,914,878 B1 | * | 7/2005 | Lindblom et al. .......... 370/219 |
| 2002/0089926 A1 | | 7/2002 | Kloth |
| 2002/0141344 A1 | * | 10/2002 | Chidambaran et al. ..... 370/236 |

FOREIGN PATENT DOCUMENTS

| | | |
|---|---|---|
| EP | 0 455 827 A1 | 11/1991 |
| EP | 0 542 233 A2 | 5/1993 |
| EP | 0 557 910 A2 | 9/1993 |
| WO | WO 98/26611 | 6/1998 |
| WO | WO 02/33912 A1 | 4/2002 |

\* cited by examiner

*Primary Examiner*—Steven Nguyen (57) ABSTRACT

A switching system for a data traffic network. A plurality of line cards provide input and output connections to a plurality of data lines and further are connected to at least two switch fabrics, one of which is designated the active switch fabric and the other designated the standby switch fabric. Data traffic is switched between the plurality of input and output line cards by the active switch fabric. When it is desired to change the active switch fabric assignment, for example due to a fault in the switch fabric, data transmissions into the active switch fabric are terminated and a drain timer is started. When the drain timer times out or the active switch provides an indication that it is empty, the active switch fabric assignment is swapped to the standby switch fabric and data is then switched through the newly assigned active switch fabric.

15 Claims, 4 Drawing Sheets

METHOD AND APPARATUS FOR SWITCHING BETWEEN ACTIVE AND STANDBY SWITCH FABRICS WITH NO LOSS OF DATA

FIELD OF THE INVENTION

This invention relates to switching in a data network, and more particularly to a method and apparatus for switching between an active and a standby switch fabric such that no data is lost during the switching process.

BACKGROUND OF THE INVENTION

Switching is the process by which a network device forwards data arriving at one of its input ports to one of its output ports. Routers and ATM (asynchronous transfer mode data transmission system) switches are referred to as packet switches in that they both switch data in the form of packets containing both data, referred to as the payload, and information about the payload, referred to as the meta-data or the header. The latter comprises one or more fields representing the destination (in the form of a destination address or a virtual circuit identifier), the source address, the data length, the data type and other useful information not pertinent to the present invention. The meta-data makes the information self-descriptive in that no additional information is required to interpret the payload data. A packet based network switches and routes each packet independently of other packets associated with a given message. Thus the receiving device must reassemble the packets to reconstruct the complete message.

Telephony switches, which transfer voice samples in the form of digital signals between the calling and the called party, are circuit-switched devices. That is, control information sent separately from the voice samples is required to set up the path from the source to the destination. Further, this circuit path remains uniquely dedicated to the call for the entire call duration.

A connectionless switching device, such as a router, reads the destination address from the meta-data and using an internal routing table, determines the output interface to which the packet should be sent. Thus the packet itself includes sufficient information to route the data to its intended destination.

A connection-oriented switch includes both a switch fabric and a switch controller. As applied to an ATM network, the packet header (note in ATM networks the data unit us typically referred to as a cell, rather than a packet) carries a virtual circuit identifier, instead of a destination address, and each switch in the network has the ability to translate from the identifier to a specific destination address. Header space is saved because identifiers are smaller than addresses, but the mapping for the identifier must be established at each switch along the path before the actual data transmission can begin. Thus during the switch set-up phase, the switch controller uses the destination address in the packet to associate a data forwarding path within the switch with a virtual circuit identifier that will be provided to the packet. This virtual circuit identifier defines the route that the packet will travel at each switch in the path until the destination is reached. During the data transfer phase, the switches move the packet along the path through the virtual circuit.

A conventional generic packet switch, whether for operation in the connection or connection-less mode, has four primary elements: input and output buffers, the switch fabric and a port mapper. The input buffers store packets as they arrive on the input line, holding the packets until they take their turn through the switch fabric. The port mapper reads either the packet destination address or the virtual circuit identifier from the packet header and then refers to an internal table to determine the appropriate packet output port from the switch fabric.

The switch fabric routes the data from input to output and can comprise a processor that reads data from an input port and routes the data to the output port. The output buffer stores data waiting to pass into the output line. A scheduler manages the output and the input buffers and arbitrates access to the output line and the switch, respectively.

Typically, the input and output buffers are included within line cards that are interposed between the switch input and output ports and the switch fabric. Each line card includes a bidirectional port connected to the switch fabric and a connection to external lines including an input line for receiving data packets and an output line for sending data packets. In lieu of a single bidirectional line connected to the switch fabric, two lines can be used, one operating as an input and the other operating as an output. In one embodiment of the switch, the processor in the switch periodically polls the input buffers within the line cards to determine if data is waiting to be transferred through the switch. In another embodiment the processor is interrupted by the arrival of a packet at an input buffer. The processor reads the packet header, determines the proper output port from a routing table and transfers the packet to the appropriate output buffer line card serving that output port.

In another switch embodiment, the line cards include sufficient processing to determine the appropriate output port for the received packet (from the packet header) and then transfer the packet to the appropriate output line card over a shared bus. Thus the shared bus operates as the switch fabric.

In a simple network switch installation, there may be two redundant switch fabrics to increase the reliability and availability of the switching process. At any given time, one switch fabric is considered the active switch fabric and transfers all data, while the other switch fabric is designated the standby. The standby switch or a switch controller may periodically receive control data from the active switch to verify that the latter remains functional. When the active switch fails the standby switch assumes the active role and passes all the data traffic. In another embodiment both of the switches are active and simultaneously carry data traffic.

A practical network router comprises multiple switch fabrics with redundancy provided by the availability of extra switches that are not required to carry the expected level of data traffic. For example, if the switching center requires n switches to transfer the data, then some limited degree of redundancy is provided by the availability of n+1 switches. Even greater redundancy (at the cost of higher cost), and therefore higher reliability and availability, is attained by the use of 2n switches. In these switch configurations the line cards are connected to each of the redundant switches.

Certain known system events will cause the redundant active and standby switches to swap roles, where the active switch goes into a standby mode and the standby switch becomes active for transferring data. The basis for this switch decision can be the result of a detected system or hardware fault or as commanded by the system operator, for instance, to allow maintenance services to be performed on one switch. The bases for making a decision to swap the roles of redundant switches are discussed at length in the literature and do not form a part of this invention.

SUMMARY OF THE INVENTION

The present invention is a method and apparatus for preventing the loss of data whenever the active and standby switches swap roles. When the swap is announced to the line cards, no further data is input to the switch fabric over the ingress path and a timer is started at the line cards. After all data that was in the switch when the swap was announced has been sent to the output destination (a process referred to as draining the switch), a switch empty signal is sent from the switch fabric or from a monitoring switch controller to each fine card. Upon receipt of the switch empty signal or timing out of the timer, whichever occurs first, the line cards are able to resume sending data through the newly designated active switch. To account for any start-up timing differences among the line cards, in one embodiment there is a preset delay, implemented by a restart timer, that must elapse before the data transmissions begin. Advantageously, the method allows hitless swapping of the active switch fabric so that no signal traffic is lost during the switch-over.

It is known that many network switches fabrics are designed to switch cells of a predetermined length. If a packet longer than a cell is presented to the switch, the switch or a preceding network processor, divides the packet into fixed length cells before executing the switching function. Because the cell length is known beforehand, these switches operate more efficiently as they are optimally designed for the cell length. Also, such switches can offer certain performance guarantees not available for variable length switches. At the egress side of the switch fabric, the cells are reassembled into packets for further processing. The present invention is applicable to both fixed-length and variable-length switches.

BRIEF DESCRIPTION OF THE FIGURES

The present invention can be more easily understood and the further advantages and uses thereof more readily apparent, when considered in view of the description of the preferred embodiments and the following figures in which.

DETAILED DESCRIPTION OF THE INVENTION

Before describing in detail the particular method and apparatus for lossless swapping of the active and standby switches in a data network switching device, in accordance with the present invention, it should be observed that the present invention resides primarily in a novel combination of steps and hardware related thereto. Accordingly, the hardware components and method steps have been represented by conventional elements in the drawings, showing only those specific details that are pertinent to the present invention so as not to obscure the disclosure with structural details that will be readily apparent to those skilled in the art having the benefit of the description herein.

Figure 1:
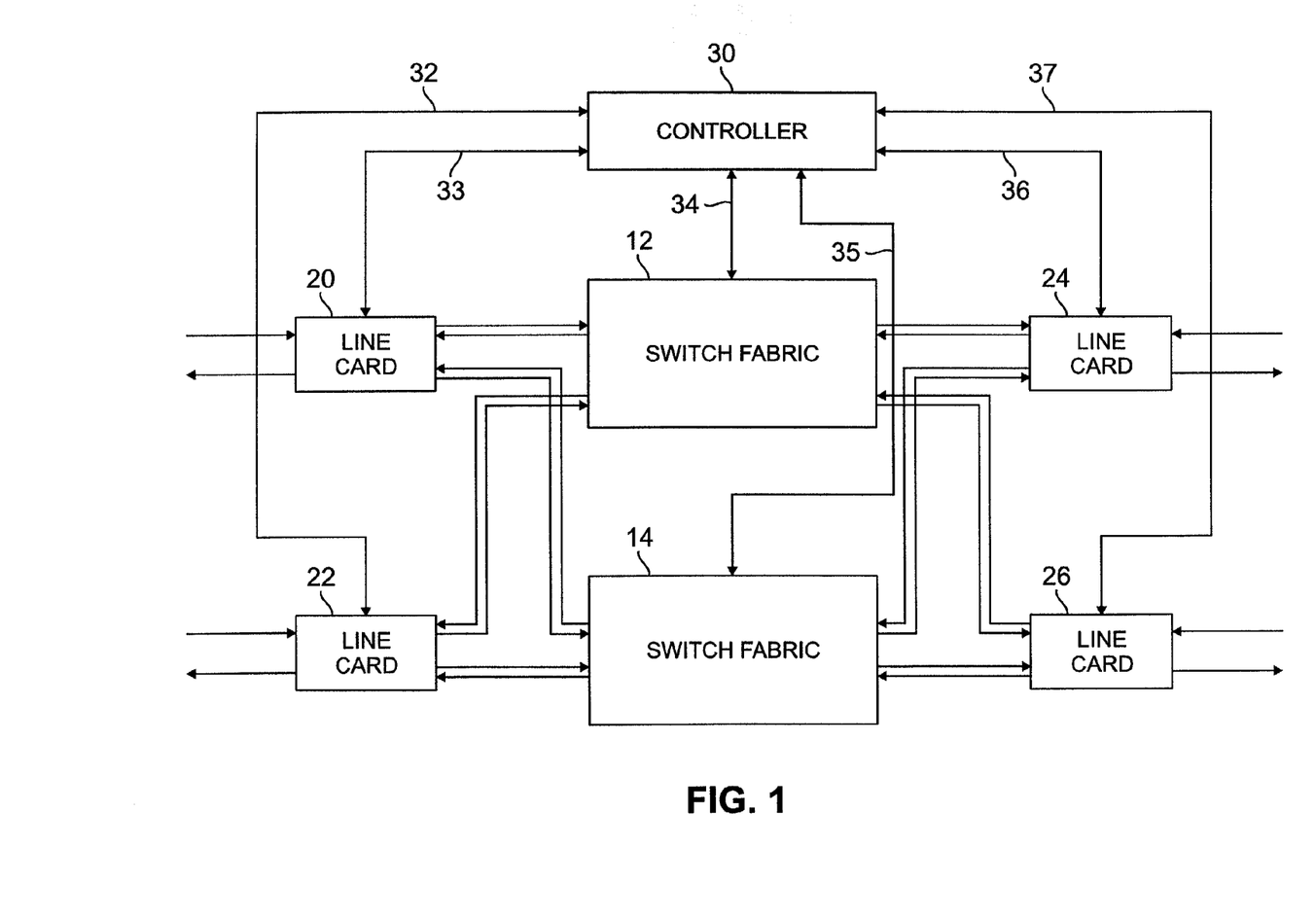
FIG. 1 is a block diagram of a switch system to which the teachings of the present invention can be applied.

FIG. 1 is a block diagram of switch fabrics 12 and 14 and their associated line cards (also referred to as port cards) 20, 22, 24 and 26, each having two unidirectional (i.e., input and output) connections or a bidirectional connection to both of the switch fabrics 12 and 14, the latter not illustrated in FIG. 1. Generally a bidirectional line allows data flow in both directions without the necessity for separate components to handle the incoming and outgoing data streams. When operative as input or ingress devices, the line cards 20, 22, 24 and 26 are responsive to externally-generated data traffic that is to be switched through either the switch fabric 12 or 14 to reach its destination. In the output mode, the line cards 20, 22, 24 and 26 also provide signals that have been switched through either the switch fabric 12 or 14 to external devices and network elements. The depiction of four line cards is merely exemplary as the invention will operate with any number of line cards, or more generally, any number of input and output ports. A controller 30 controls certain functions, as know to those skilled in the art, of the switch fabrics 12 and 14 and the line cards 20, 22, 24 and 26 by way of a bidirectional connection to each, identified in FIG. 1 by links 32, 33, 34, 35, 36 and 37. In another embodiment, each switch fabric 12 and 14 is controlled by a separate controller. The invention applies to either embodiment. According to the present invention, as will be described below, the controller 30 commands each of the line cards 20, 22, 24 and 26 to switch from one switch fabric to the other in such a way that no data is lost during the transfer process.

Input data is provided to a line card, the line card 20, for example, and buffered within the line card until the active switch fabric, switch fabric 12, for example, transfers the data packet to the correct output line card, i.e., the specific line card providing a path to the packet destination. The correct output port is determined by the controller 30 in a connection-oriented switch or by the active switch fabric 12 in a connectionless switch, by reading the destination address or the virtual circuit identifier in the data packet header.

FIG. 1 could also represent a circuit-switched system, a telephony switch, for example. In this case the switched signals are digital samples representing the audio signals of a voice conversation.

Figure 2:
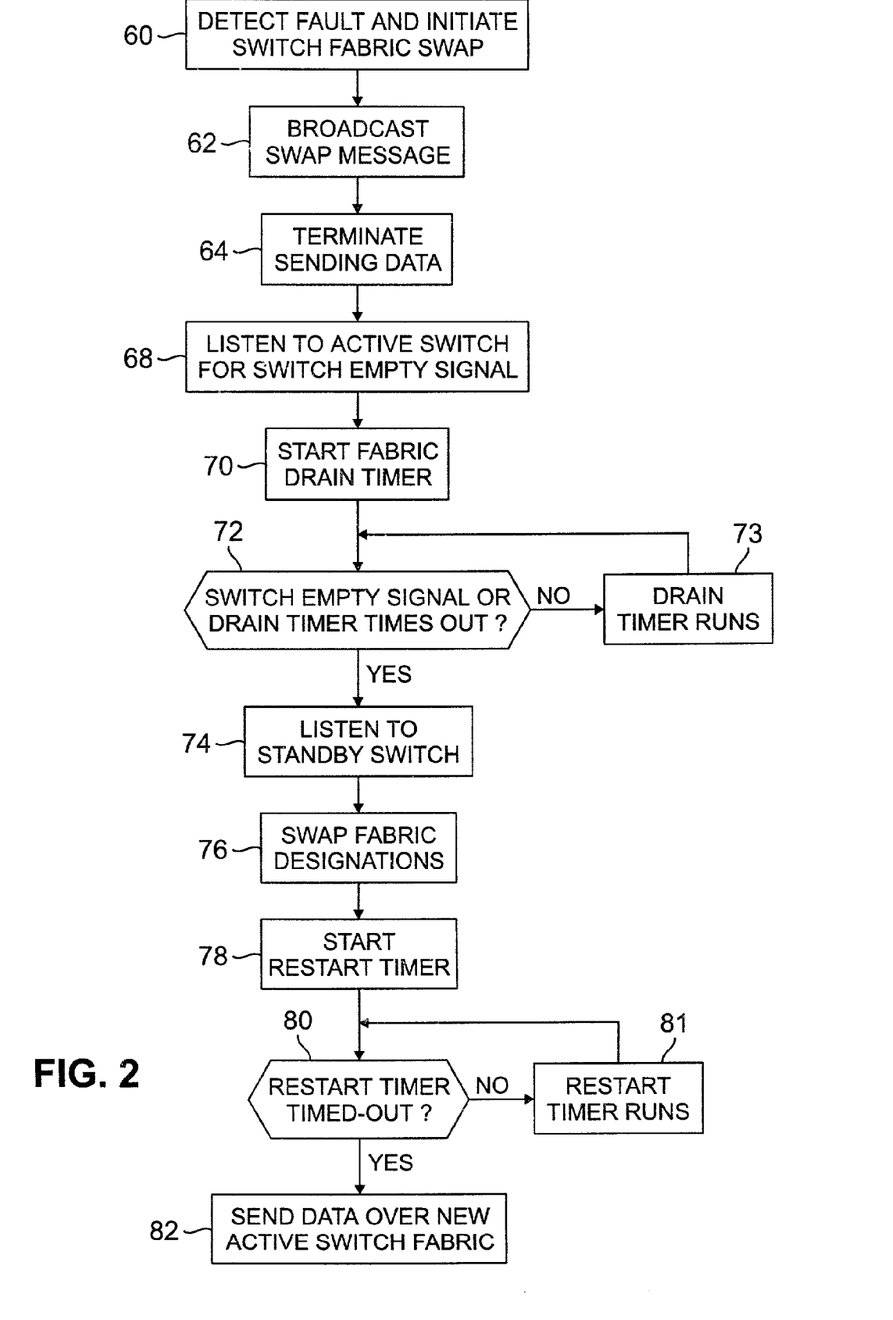
FIG. 2 is a flow chart of the method according to the present invention.

FIG. 2 is a flow chart describing the method of lossless active/standby switching according to the present invention. Those skilled in the art recognize that this method can be executed in software according to executable code derived from the software flow chart of the FIG. 2 and processed by a dedicated computer or by a time-shared computer (i.e., a computer that executes multiple software programs) present in the line cards 20, 22, 24 and 26. The teachings can also be implemented in hardware according to hardware elements to be discussed in conjunction with FIG. 4.

At a step 60, detection of a system fault initiates a swap of the active and standby switches. For example, the swapping process is initiated by a redundancy management processor (not shown) that monitors the hardware elements of the line cards 20, 22, 24 and 26, the switch fabrics 12 and 14, the interconnections between these components and the flow of traffic into and out of the switch fabrics 12 and 14. Whenever a failure or fault condition that may be alleviated by a switch fabric swap is detected, at a step 62 the redundancy management processor broadcasts the swap message to all the line cards 20, 22, 24 and 26 and to the switch fabrics 12 and 14. Although the broadcast message is sent to all line cards in the network, it is not necessarily received synchronously at each one. One example of a technique that can be employed to signal the line cards 20, 22, 24 and 26 that a switch-over is required, and is further described and claimed in the commonly-owned United States Patent Application entitled, "Method for Encoding/Decoding a Binary Signal State in a Fault Tolerant Environment," filed on Dec. 21, 2001, and assigned application Ser. No. 10/026,353, which is hereby incorporated by reference.

In response to the switch-over or swap signal, at a step 64 the line cards 20, 22, 24 and 26 that are operating in the ingress mode terminate sending data into the active switch fabric. (In certain embodiments, specified line cards operate only in an ingress mode and others operate only in an egress mode.) Because of the lack of time synchronism associated with receipt of the broadcasted swap message, all the line cards 20, 22, 24 and 26 do not stop sending traffic to the switch fabric simultaneously.

The line cards 20, 22, 24 and 26 then begin listening to the active switch fabric for an indication that the switch is empty. See a step 68. At a step 70, the line cards 20, 22, 24 and 26 start an internal drain timer, having a programmable timeout range. In one embodiment, the timer range is about one millisecond, with the actual time determined by the maximum synchronization error in the broadcasted swap signal and the time required to empty the active fabric of data. The drain timer range is an interval that should be sufficient for the active switch to empty under normal operating conditions. However, there may be a fault in the active switch that prevents it from completely draining. There could also be a data path within the switch fabric that is serviced by the fabric scheduler (the scheduler determines which data paths are serviced in accordance with a predetermined priority scheme) at a relatively low rate, therefore causing data traffic to back-up on this path. Further, the situation can be exacerbated if there is a large amount of data traffic on this path. Any one of these situations can prevent the switch fabric from draining within an acceptable time interval. Thus the drain timer range establishes an upper bound for the period that the line cards will wait until restarting their data transmission through the newly-designated active switch fabric.

Although the drain timer mechanism is not necessarily required for the present invention, its use avoids a situation where the line cards must wait for an extended period before resuming data transmission or a situation where the active fabric never empties due to a fault in one of the system components. Additionally, it is prudent to limit the drain time because during this interval data traffic is not passing through the switch, and instead is accumulating in buffers at the input ports of the line cards. If the traffic halt is protracted, then these buffers can overflow and data will be lost.

In a preferred embodiment, the steps 64, 68 and 70 occur nearly simultaneously or in parallel, rather than the serial arrangement suggested by the flowchart of FIG. 2. While the drain timer is running, the result from a decision step 72 is negative and the process loops through a step 73, indicating the continued running of the drain timer, back to the decision step 72, until the decision returns a positive result, from which the process continues to a step 74.

Once the drain timer times out or the switch empty signal is received (see the decision step 72), then the line cards begin listening to the standby switch fabric (at a step 74) for an indication that the switch is operational and capable of accepting data traffic. In one embodiment, the line cards 20, 22, 24 and 26 listen for switch back pressure information. This is useful to determine the switch internal status and the quantity of data that the soon-to-be active switch can accommodate. Thus the line cards will have correct back pressure information from the new active fabric when they begin transmitting data to it.

In one embodiment, the egress path receives the back pressure information and passes it to the ingress path device. Prior to the switchover, the back pressure information is provided by the active fabric. As soon as the switchover is started, the ingress device stops all data transmission into the switch, and the back pressure information from the standby fabric is monitored.

In another embodiment, the controller 30 or the line cards 20, 22, 24 or 26 periodically send a signal to the standby switch fabric to determine whether it is operational. In any case, if the standby switch is determined to be operational, then the fabrics swap their designations at a step 76.

At a step 78 each line card 20, 22, 24 and 26 starts a restart timer. Although not necessarily required, the use of a restart timer at each line card 20, 22, 24 and 26 accommodates for any variations (also referred to as timing skews) among the line cards in the time interval between an affirmative result from the decision step 72 (receiving the switch empty signal or time out of the drain timer) and the start of data transmissions by a line card into the newly activated switch. The restart timer avoids situations where an ingress line card could start sending data before the egress line card at the other end of the switch fabric path is ready to receive data traffic. At a decision step 80 the value of the restart timer is checked to determine if it has timed out. When the restart timer times out, processing continues to a step 82 where the line cards 20, 22, 24 and 26 begin sending data traffic through the new active switch. Until the restart timer times out and the result from the decision step 80 is affirmative, the process loops through a step 81, indicating the continued running of the restart timer.

It should be noted that although the present invention avoids the loss of data during the swapping of the active and standby switches, there may be certain situations where data will be lost nonetheless. These situations are beyond the scope and purview of the present invention. For example, data on a faulty line card or on a faulty path within the switch fabric, either of which could trigger the switchover process, will most likely be lost. Also, as data traffic accumalates in the input line buffer while the switches are executing the swapping process, the buffer management process may discard some of the stored data. This cannot be avoided by the process of the present invention, which is intended to prevent the lose of data between non-faulty switch devices. Additionally, the present invention provides a completely lossless switchover in the event of an administrative switch swap action unrelated to any failure in the system.

Figure 3:
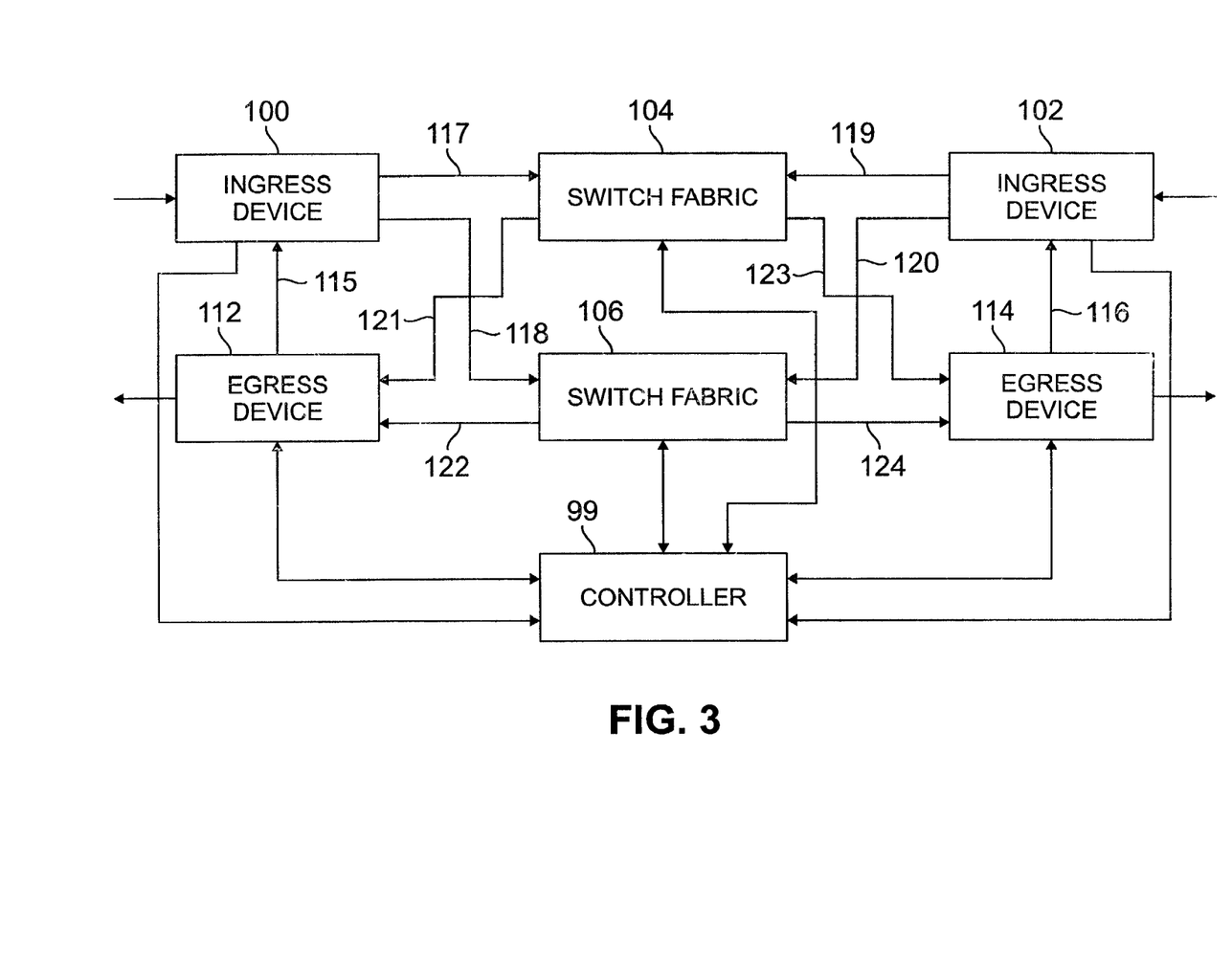
FIG. 3 is a block diagram of a second embodiment to which the teachings of the present invention can be applied.

Another application of the teachings of the present invention is depicted in FIG. 3. Ingress devices 100 and 102 are responsive to external data traffic input to redundant switch fabrics 104 and 106 for switching to one of the egress devices 112 and 114. The designated active switch fabric switches the data switching operation from the ingress to the egress device. The standby switch fabric also receives the data, but does not perform any switching operations. From the egress devices 112 and 114, the switched traffic continues propagation toward its intended destination. The present invention relates to the process of switching between the redundant switch fabrics 104 and 106 in such a way that no data is lost.

Control signals are provided from each egress device 112 and 114 to the corresponding ingress device 100 and 102 over links 115 and 116, respectively. Also the controller 99 provides control signals to the ingress devices 100 and 102 and to the egress devices 112 and 114 over links as shown. In one embodiment, the primary control functions are implemented between the controller 99 and the egress devices 112 and 114. Control functions associated with the ingress devices 100 and 102 requires only the ability to stop data transmissions toward the active fabric and the ability to restart the transmissions to the standby fabric (that is, the newly designated active fabric) when appropriate.

The illustration of two ingress and two egress devices is merely exemplary. Note also that the ingress devices 100 and 102 and the egress devices 112 and 114 communicate unidirectionally with the switch fabrics 100 and 102; the line cards 20, 22, 24 and 26 of FIG. 1 are bidirectional communications devices. The ingress device 100 communicates with the switch fabrics 104 and 106 over one-way links 117 and 118, respectively. The ingress device 102 communicates with the switch fabrics 104 and 106 over one-way links 119 and 120, respectively. Also, the switch fabrics 104 and 106 communicate with the egress devices 112 over one-way links 121 and 122, respectively. The switch fabrics 104 and 106 communicate with the egress device 114 over one-way links 123 and 124, respectively.

Application of the teachings of the present invention to the environment of FIG. 3 can be executed in software, according to executable code derived from the software flow chart of FIG. 2 and processed by a dedicated computer or on a time-shared basis by a computer. The teachings can also be implemented in hardware according to the hardware elements of FIG. 4, which in one embodiment are included within the line cards 20, 22, 24 and 26 illustrated in FIG. 1.

Figure 4:
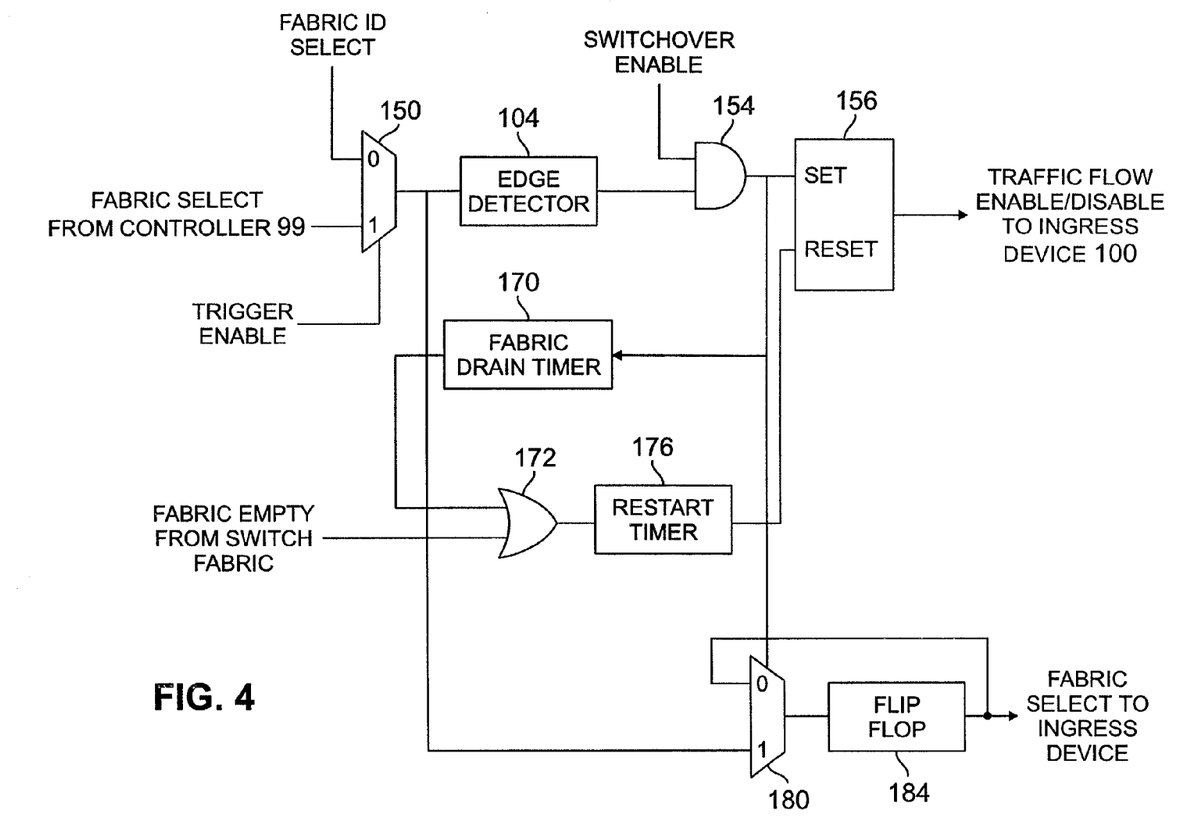
FIG. 4 is a block diagram of logic hardware for implementing the teachings of the present invention.

As discussed above in conjunction with FIG. 1, in the FIG. 4 logic implementation, an external redundancy management processor determines whether a switchover in the active and standby fabrics is required. When required, the redundancy management processor issues a command to the controller 99 of FIG. 3. (In one embodiment, the redundancy management processor is included within the controller 99.) In response, the controller 99 broadcasts a switch swap command to the egress devices 112 and 114 by broadcasting an appropriate signal on the fabric select terminal of FIG. 4, of the egress devices 112 and 114.

The following discussion applies to the egress device 112 and its corresponding ingress device 100 and also assumes the switch fabric 104 is the active fabric. The other ingress/egress devices function in an identical manner. In one embodiment, at start-up the controller 99 is initialized to identify one of the two switch fabrics 104 and 106 as the active switch. When a switchover is commanded, the controller 99 broadcasts a switch command signal to all line cards, including those in the ingress path. This signal is input to the high input pin of a multiplexer 150. The low input pin thereof is responsive to a software-based fabric identification select signal that is used for testing the FIG. 4 logic. Also, the enable terminal of the multiplexer 150 is driven low by testing software, such that the software-provided fabric identification signal is selected for the multiplexer output. By controlling the enable terminal, the testing software overrides the fabric select signal provided by the controller 99. Thus, under operational conditions, the trigger enable terminal is high so that the fabric select signal from the controller 99 is selected as the output of the multiplexer 150. Thus in response to swap signal, the output signal of the multiplexer 150 changes state.

An edge detector 152 detects the change in the multiplexer output, and produces a short-duration pulse into a first terminal of an AND gate 154. The second terminal of the AND gate 154 is held high by a switchover signal provided by testing software. When a test of the FIG. 4 logic is desired, the second AND gate terminal is driven low, disabling the output signal from the edge detector 152. Thus during normal operation the output signal from the AND gate 154 goes high when the output terminal of the multiplexer 150 goes high, and the flip-flop 156 is set. The flip-flop output terminal provides a traffic flow enable/disable signal as an input to the ingress device 100 over the link 115 shown in FIG. 3. When the flip-flop 156 is set, the ingress device 100 terminates sending data traffic to the switch fabric 104 over the link 117.

The output pulse from the AND gate 154 is also provided as an input to a fabric drain timer 170 for setting the timer to a predetermined initial value and initiating a timer countdown sequence. The functionality of the fabric drain was discussed above in conjunction with the flowchart of FIG. 2. When the timer reaches zero, the timer output signal goes high and thus one terminal of an OR gate 172 goes high, causing the OR gate output to also go high. In one embodiment, the drain timer initial value can be zero, causing an immediate switchover. In another embodiment the initial value is set to provide a sufficient time for the active switch fabric to drain, i.e., complete the switching process for all current data. The OR gate 172 is also driven high by a fabric empty signal, provided as an input to a second terminal thereof, from the active switch fabric 104 over the link 121. The fabric empty signal is further discussed in conjunction with the FIG. 2 flowchart. In a preferred embodiment, the switch fabric empty signal is provided to the egress device 112 in a diagnostics byte, that is one byte of the data traffic packets or cells sent from the active switch fabric 104 to the egress device 112.

A high signal at the output of the OR gate 172 initiates a countdown sequence of a restart timer 176, based on a predetermined initial timer value. When the countdown sequence ends, the restart timer 176 provides a high signal to the reset terminal of the flip-flop 156. Thus the flip-flop 156 is reset and the low output signal is provided as an input to the ingress device 100 over the link 115 for enabling data traffic flow.

The output pulse from the AND gate 154 is also provided as a control input to a multiplexer 180. Before the switchover occurs, the control input is low and thus the mulitplexer output signal is the input signal at the low terminal thereof, which is in turn determined by the output of a flip-flop 184. The flip-flop output represents the currently active switch fabric and is provided to the ingress device 100 over the link 115. The feedback loop from the flip-flop output to the low input terminal of the multiplexer 180 holds the flip-flop output whenever the mulitplexer control line is low.

When a switchover occurs, the pulse on the control line of the multiplexer 180 causes the multiplexer output to switch to the value of the high input terminal. Note that the high input terminal is connected to the output terminal of the flip-flop 150, and recall that this value goes high whenever a switchover occurs. Thus the flip-flop 184 changes state when a switchover is commanded and the ingress device 100 is thereby instructed to change the active switch fabric. The signal from the flip-flop 184 also serves as a trigger to another component of the egress device (not shown in FIG. 4) for reading the back pressure information from the standby switch. As discussed above in conjunction with the FIG. 2 flowchart, this back pressure information is used to determine the health of the standby switch to ensure that it is able to accept data when the swapping process is completed and it becomes the active switch Although the embodiment of FIG. 4 is limited to the situation where each ingress and egress device is responsive to two redundant switch fabrics, those skilled in the art recognize that in an embodiment where more than two switch fabrics communicate with a plurality of ingress and egress devices, similar logic elements are required to identify the active switch fabric.

Also, in a preferred embodiment the packets or cells provided by the ingress device 100 are in fact sent to both the fabric switches 104 and 106, although only one of the fabrics is the active fabric. A fabric identifier field is included in each packet or cell. Both of the receiving fabrics check the field as the packets are input, to determine which of the two is the active fabric based on a match between the fabric identifier and the value in the fabric identifier field. The packets or cells associated with the matched fabric identifier are serviced by the active switch fabric; the others are ignored. The value in the fabric identifier is field is determined at the ingress device 100 based on the fabric select value discussed in conjunction with FIG. 4.

Although certain preferred embodiments of the present invention are disclosed and illustrated herein, modifications and changes may be apparent to those skilled in the art. It is therefore understood that the appended claims are intended to cover all such modifications and changes that are within the spirit of the invention.

What is claimed is:

1. A method for controlling data flow between a plurality of input devices and a plurality of output devices through a first or a second switch fabric interposed therebetween, wherein the first switch fabric is in an active mode and the second switch fabric is in a standby mode, said method comprising:
    (a) producing a control signal prior to causing the first switch fabric to assume the standby mode and the second switch fabric to assume the active mode;
    (b) in response to the control signal, terminating the transmission of data into the first switch fabric from the plurality of input devices;
    (c) in response to the control signal, starting a drain timer;
    (d) in response to the drain timer having timed out or receipt of a switch fabric empty signal from the first switch fabric, controlling the first switch fabric to assume the standby mode and the second switch fabric to assume the active mode;
    (e) subsequent to the drain timer having timed out or receipt of the switch fabric empty signal from the first switch fabric, starting a restart timer; and
    (f) in response to the restart timer having timed out, sending data from the plurality of input devices into the second switch fabric.

2. The method of claim 1 wherein the drain timer has a time-out value selected such that under normal operating conditions any data in the first switch fabric will be routed out of the first switch fabric by the time the drain timer reaches the time-out value.

3. The method of claim 1 wherein the restart timer is started in response to the drain timer having timed out or receipt of the switch fabric empty signal from the first switch fabric.

4. The method of claim 1 further including the step of determining if the second switch fabric is operational prior to controlling the first switch fabric to assume the standby mode and the second switch fabric to assume the active mode.

5. The method of claim 1 wherein the plurality of input devices and the plurality of output devices are associated with a packet data network.

6. The method of claim 1 wherein the plurality of input devices and the plurality of output devices are associated with a telephony network and wherein the data represents voice signals.

7. The method of claim 1 wherein the control signal is provided in response to a fault in the first switch fabric.

8. A method for switching between a first and a second switch fabric in a data network, wherein a plurality of line cards are connected to both the first and the second switch fabrics for transmitting and receiving data traffic, wherein one of the first and the second switch fabrics is designated as an active switch fabric and the other of the first and second switch fabrics is designated as a standby switch fabric, said method comprising:
    (a) at each of the plurality of line cards, receiving a control signal;
    (b) in response to the control signal, terminating the transmission of data traffic from each one of the plurality of line cards into the active switch fabric;
    (c) in response to the control signal, at each one of the plurality of line cards, starting a drain timer;
    (d) sending a switch fabric empty signal from the active switch fabric to each of the line cards when the active switch fabric is empty;
    (e) at each one of the plurality of line cards, determining whether the drain timer has timed out or the switch fabric empty signal has been received;
    (f) in response to the drain timer having timed out or receipt of the switch fabric empty signal, redesignating the previously-designated standby switch fabric as the active switch fabric and the previously-designated active switch fabric as the standby switch fabric;
    (g) at each one of the plurality of line cards, subsequent to the drain timer having timed out or receipt of the switch fabric empty signal, starting a restart timer; and
    (h) in response to the restart timer having timed out, sending and receiving data traffic between each of the plurality of line cards and the active switch fabric.

9. A switch controller for controlling data flow between a first and a second switch fabric in a data network, wherein a plurality of line cards are connected to both the first and the second switch fabrics for transmitting and receiving data traffic, wherein one of the first and second switch fabrics is designated as an active switch fabric and the other of the first and second switch fabrics is designated as a standby switch fabric, and wherein said switch controller is responsive to a switch fabric empty signal indicating that there is no data traffic in the active switch fabric and further responsive to a switch fabric select signal identifying the active switch fabric, said switch controller comprising:
    a first circuit module responsive to the switch fabric select signal for providing a first signal to the plurality of line cards, wherein said first signal instructs the plurality of line cards to terminate sending data traffic into the active switch fabric;
    a drain timer started in response to the switch fabric select signal for providing a first time-out signal when said drain timer has timed out;
    a logic device producing a second signal in response to at least one of said first time-out signal and said switch fabric empty signal; and
    a restart timer started in response to said second signal for providing an enable signal when said restart timer has timed out, wherein said enable signal is input to the plurality of line cards for instructing the plurality of line cards to begin sending data traffic into the active switch fabric, and wherein the plurality of line cards are responsive to the switch fabric select signal for identifying the active switch fabric.

10. The switch controller of claim 9 wherein the drain timer has a time-out value selected such that under normal operating conditions any data in the active switch fabric will be routed out of the active switch fabric by the time the drain timer reaches the time-out value.

11. The switch controller of claim 9 wherein the restart timer has a time-out value selected such that each one of the plurality of line cards is enabled for sending and receiving data traffic at about the same time.

12. A switching system for carrying data traffic between a plurality of input and output lines, said switching system comprising:
  a first and a second switch fabric for switching data traffic between one or more of said plurality of input and output lines, wherein one of said first and said second switch fabrics is an active switch fabric as identified by a switch fabric select signal, and wherein the active switch fabric provides a switch fabric empty signal indicating there is no data traffic in the active switch fabric;
  a plurality of line cards connected to one or more of the plurality of input and output lines and further connected to said first and said second switch fabrics for sending data traffic into and receiving data traffic from said first and said second switch fabrics;
  a first circuit module responsive to the switch fabric select signal for providing a first signal to the plurality of line cards, instructing the plurality of line cards to terminate sending data traffic into the active switch fabric;
  a drain timer started in response to the switch fabric select signal for providing a first time-out signal when said drain timer has timed out;
  a logic device for producing a second signal in response to at least one of said first time-out signal and said switch fabric empty signal; and
  a restart timer started in response to said second signal for providing an enable signal when said restart timer has timed out, wherein said enable signal is input to the plurality of line cards for instructing the plurality of line cards to begin sending data traffic into the active switch fabric, and wherein the plurality of line cards are responsive to the switch fabric select signal for identifying the active switch fabric.

13. The switching system of claim 12 wherein the plurality of line cards is associated with a packet data network.

14. The switching system of claim 12 wherein the plurality of line cards is associated with a telephony network and wherein the data traffic represents voice signals.

15. The switching system of claim 12 wherein the first signal is provided in response to a fault in one of the first and second switch fabrics.

* * * * *